US011654595B2

(12) United States Patent
Davidson et al.

(10) Patent No.: US 11,654,595 B2
(45) Date of Patent: May 23, 2023

(54) DEVICES AND METHODS FOR BUILDING PANEL DEFORMATION

(71) Applicant: Tapered End, LP, Murrysville, PA (US)

(72) Inventors: Joseph W Davidson, Pittsburgh, PA (US); Kenneth J Wolff, Murrysville, PA (US)

(73) Assignee: TAPERED END, LP, Murrysville, PA (US)

( * ) Notice: Subject to any disclaimer, the term of this patent is extended or adjusted under 35 U.S.C. 154(b) by 223 days.

(21) Appl. No.: 16/956,752

(22) PCT Filed: Dec. 24, 2018

(86) PCT No.: PCT/US2018/067447
§ 371 (c)(1),
(2) Date: Jun. 22, 2020

(87) PCT Pub. No.: WO2019/133571
PCT Pub. Date: Jul. 4, 2019

(65) Prior Publication Data
US 2021/0060817 A1 Mar. 4, 2021

Related U.S. Application Data

(60) Provisional application No. 62/612,324, filed on Dec. 30, 2017.

(51) Int. Cl.
*B28B 17/02* (2006.01)
*B28B 11/00* (2006.01)
(Continued)

(52) U.S. Cl.
CPC ............. *B28B 17/023* (2013.01); *B05D 1/02* (2013.01); *B28B 11/003* (2013.01);
(Continued)

(58) Field of Classification Search
CPC . B28B 17/023; B28B 11/003; B28B 2252/00; B28B 2401/21; B28B 2203/30;
(Continued)

(56) References Cited

U.S. PATENT DOCUMENTS 3,409,422 A * 11/1968 Gulotta ................... C03B 29/12
65/351
4,366,032 A * 12/1982 Mikitenko ............. C07C 29/84
203/84

(Continued)

FOREIGN PATENT DOCUMENTS

CN          100333841 C  *  8/2007

*Primary Examiner* — William P Fletcher, III
(74) *Attorney, Agent, or Firm* — Ronald S. Lombard

(57) ABSTRACT

A method and device for modifying a building panel. The building panel including a first surface comprising a facing paper and a second surface comprising a backing paper with a core of calcium sulfate hemihydrate arranged between the facing paper and the backing paper. The method including applying a solution to a predetermined portion of the facing paper, the backing paper, or the facing and backing paper to sufficiently hydrate at least a predetermined portion of the hemihydrate core to convert it to deformable calcium sulfate dihydrate. The solution including at least one alcohol and water. A predetermined force is applied to the deformable portion of the building panel. The predetermined force causing a desired deformation of the predetermined hydrated portion of the building panel. The device for modifying a building panel according to the method includes a building panel mounting structure, a liquid applicator, and a force applicator.

11 Claims, 8 Drawing Sheets

(51) Int. Cl.
  *C04B 41/46*    (2006.01)
  *C04B 41/62*    (2006.01)
  *B05D 1/02*     (2006.01)
  *C04B 41/00*    (2006.01)

(52) U.S. Cl.
  CPC .......... *C04B 41/009* (2013.01); *C04B 41/463* (2013.01); *C04B 41/62* (2013.01); *B05D 2252/00* (2013.01); *B05D 2401/21* (2013.01)

(58) Field of Classification Search
  CPC ....... B05D 1/02; C04B 41/009; C04B 41/463; C04B 41/62; C04B 41/46; E04C 2/043
  See application file for complete search history.

(56) References Cited

U.S. PATENT DOCUMENTS

| | | | | |
|---|---|---|---|---|
| 4,686,053 | A * | 8/1987 | Baviere | C09K 8/584 |
| | | | | 507/938 |
| 4,705,909 | A * | 11/1987 | Yan | C07C 7/13 |
| | | | | 585/828 |
| 5,406,006 | A * | 4/1995 | Hill | C07C 29/16 |
| | | | | 502/25 |
| 6,319,312 | B1 * | 11/2001 | Luongo | E04C 2/043 |
| | | | | 156/39 |
| 2001/0044016 | A1 * | 11/2001 | Watras | B32B 29/00 |
| | | | | 156/45 |
| 2004/0038065 | A1 * | 2/2004 | Francis | B32B 13/04 |
| | | | | 156/39 |
| 2004/0081524 | A1 * | 4/2004 | Barnett | B23C 3/30 |
| | | | | 409/178 |
| 2009/0142604 | A1 * | 6/2009 | Imai | B01J 37/0219 |
| | | | | 428/447 |

* cited by examiner

200

201
Apply a light alcohol solution to the facing paper of a gypsum panel

202
Pass the light alcohol solution through the paper into the core of the panel

203
At least partially hydrate the hemihydrate core to the dihydrate

204
Press a stamp into the paper, leaving an imprinted pattern from the stamp in the gypsum panel

205
Remove the stamp

206
Dry the panel

FIG. 2

DEVICES AND METHODS FOR BUILDING PANEL DEFORMATION

RELATED APPLICATIONS

The present application claims the benefit of the filing date of U.S. Provisional Application 62/612,324, filed Dec. 30, 2017.

TECHNICAL FIELD

The methods and devices described herein relate generally to building panel modifications.

BACKGROUND

Gypsum-based building panels, known by names such as drywall, Sheetrock®, plasterboards, wallboards, gypsum panels, sheet rock, or gypsum boards, are panels made primarily from calcium sulfate dihydrate (gypsum) pressed and dehydrated (to the hemihydrate) between a facer and a backer. These are typically thick sheets of paper. Additives are sometimes used to modify the chemistry of the gypsum for improved properties. These include fiberglass, paper, plasticizers, foaming agents, and other additives for reduced mildew, heightened fire resistance, and lower water absorption.

Gypsum-based building panels, known herein simply as "gypsum panels," are typically used for interior walls and ceilings. Gypsum panels are available for purchase with various thicknesses (e.g., ¼", ⅜", ½", ⅝", ¾", 1", in the U.S., with metric thicknesses from 9.5 mm to 25 mm). Gypsum panels are typically 48" wide by 96" long in the U.S., though widths of 54" and 96" and lengths of as much as 16' are available. Boards are typically thinner at the edges due to the edge-papering process, creating a taper; for example: to meet ASTM standards for the edge taper between $15/1000$ and $75/1000$.

As rooms are not typically built in a manner that gypsum panels will fit optimally, boards must be cut to fit. After cutting gypsum boards to shape and attaching them to the walls and ceilings, finishing typically involves taping the gaps, mudding the gaps, sanding the mud, and then painting over the sheetrock and mud. Normally, multiple stages of mudding are required to produce a smooth surface between adjacent panels.

SUMMARY

In a first aspect, the disclosure provides a method for modifying a building panel. A solution is applied to a surface of the building panel. The solution consists of light alcohols. A force is applied to a portion of the building panel substantially normal to a horizontal plane of the panel. The force causes a deformation of the portion of the building panel.

In a second aspect, the disclosure provides a device for modifying a building panel. The device includes a mounting structure on which the building panel is mounted, a liquid applicator that applies a solution of light alcohols onto a surface of the building panel, and a force applicator that applies a force to a portion of the building panel substantially normal to a horizontal plane of the panel. The force causes a deformation of the portion of the building panel.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2 is a diagram showing a method for stamping a pattern in a gypsum panel.

DETAILED DESCRIPTION

It will be readily understood that the components of the described devices, systems, and methods, as generally described and illustrated in the Figures herein, could be arranged and designed in a wide variety of different configurations. Thus, the following more detailed description of the embodiments of the described devices, systems, and methods, as represented in the Figures, is not intended to limit the scope of the described devices, systems, and methods, as claimed, but is merely representative of certain examples of presently contemplated embodiments in accordance with the described devices, systems, and methods.

Gypsum-based building panels, referred to as "gypsum panels" herein, are used to provide smooth interior walls and ceilings in office and home construction. Gypsum panels, when cut to size, have differing edge thicknesses due to the thicker interior and thinner edges. As such, when panels are mounted and a thick, interior edge is butted up against a thin exterior edge or another thick interior edge, the junction does not provide a concave area that can readily be taped and mudded creating a smooth even plane, but rather, a large amount of mudding is required to attempt to produce a level transition between boards; which can never fully be attained since the required mudding creates a convex profile. Devices and methods to form, shape, and pattern gypsum panels are shown herein. These may be applied to uncut and cut boards. This forming, shaping, and patterning may involve compression, embossment, imprinting, curving, reforming and enhancing the gypsum panels. The term, "deforming," is used as a generic term to cover the forming, shaping, and patterning discussed.

In a preferred embodiment, a solution of light alcohols in water is applied to the facing, backing, or both facing and backing paper of a gypsum panel. In other embodiments, the solution is applied to the edge or edges. The addition of the light alcohol solution facilitates the transport of water through the facing and/or backing paper and into the hemihydrate interior, hydrating the hemihydrate to produce the dihydrate. The dihydrate may be formed, shaped and patterned, while the hemihydrate is brittle and application of forces normal to the plane of the panel cracks the interior structure, resulting in broken gypsum panels. The moistened gypsum panels are formed, shaped, and patterned as desired.

Figure 1:
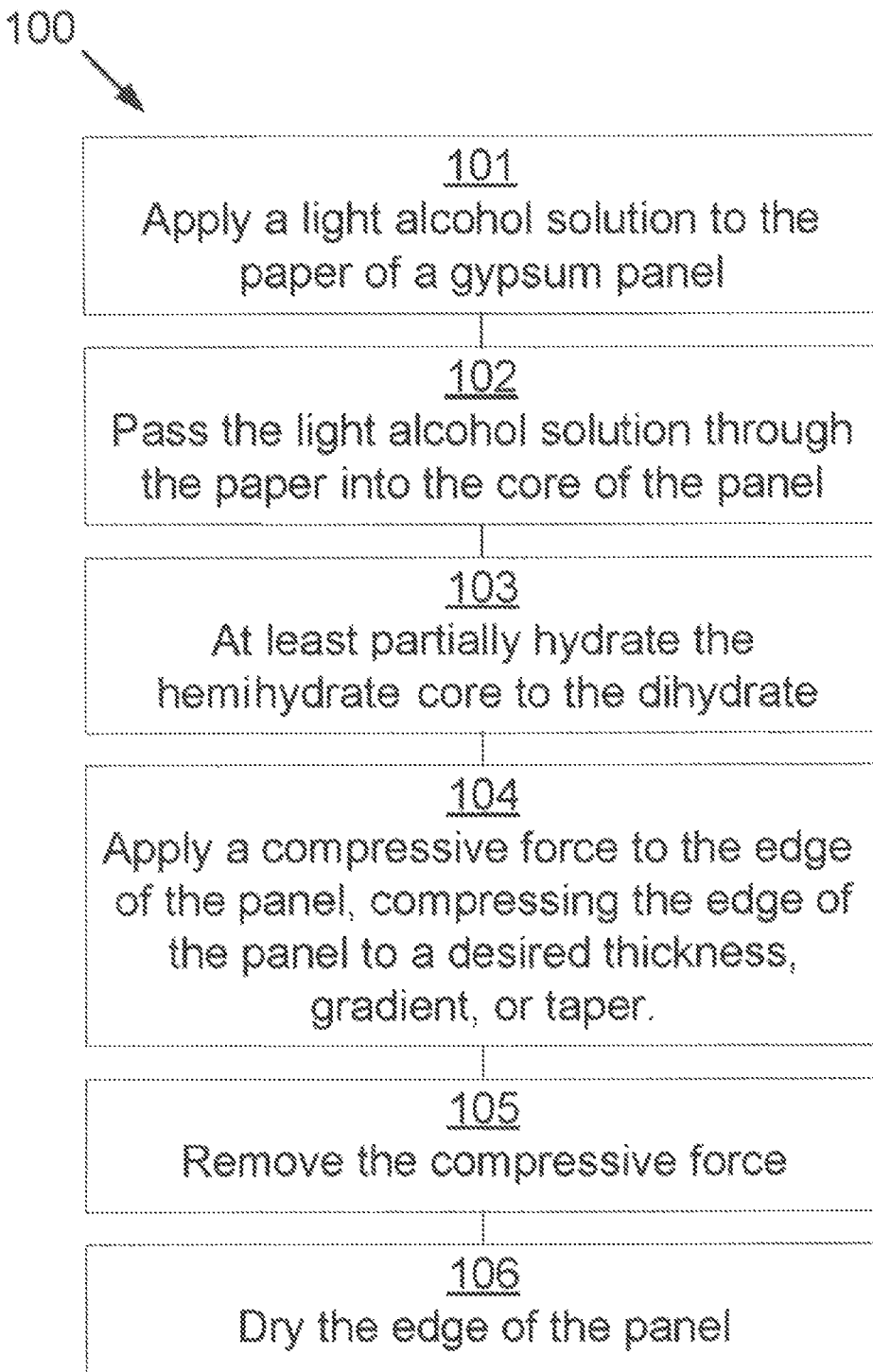
FIG. 1 is a diagram showing a method for compressing an edge of a gypsum panel.

Referring now to the Figures, FIG. 1 is a diagram showing a method 100 for compressing an edge of a gypsum panel that may be used in the described devices and methods. At 101, a light alcohol solution is applied to the facing and the backing paper of a gypsum panel. At 102, the light alcohol solution passes through the facing and the backing paper into the calcium sulfate hemihydrate core of the gypsum panel. At 103, the hemihydrate is at least partially hydrated to form the dihydrate. At 104, a compressive force is applied to the edge of the panel, compressing the edge of the panel to a desired thickness, gradient or taper. At 105, the compressive force is removed. At 106, the edge of the panel is dried to remove the light alcohol solution and return the calcium sulfate to the hemihydrate form. In some embodiments, the desired compression ranges from 5/1000 to 275/1000.

Referring now to FIG. 2, FIG. 2 is a diagram showing a method 200 for stamping a pattern in a gypsum panel that may be used in the described devices and methods. At 201, a light alcohol solution is applied to the facing paper of a gypsum panel. At 202, the light alcohol solution passes through the facing paper into the calcium sulfate hemihydrate core of the gypsum panel. At 203, the hemihydrate is at least partially hydrated to form the dihydrate. At 204, a stamp is pressed into the facing paper of the gypsum panel, leaving an imprinted pattern from the stamp in the gypsum panel. At 205, the stamp is removed. At 206, the gypsum panel is dried to remove the light alcohol solution and return the calcium sulfate to the hemihydrate form.

Figure 3A:
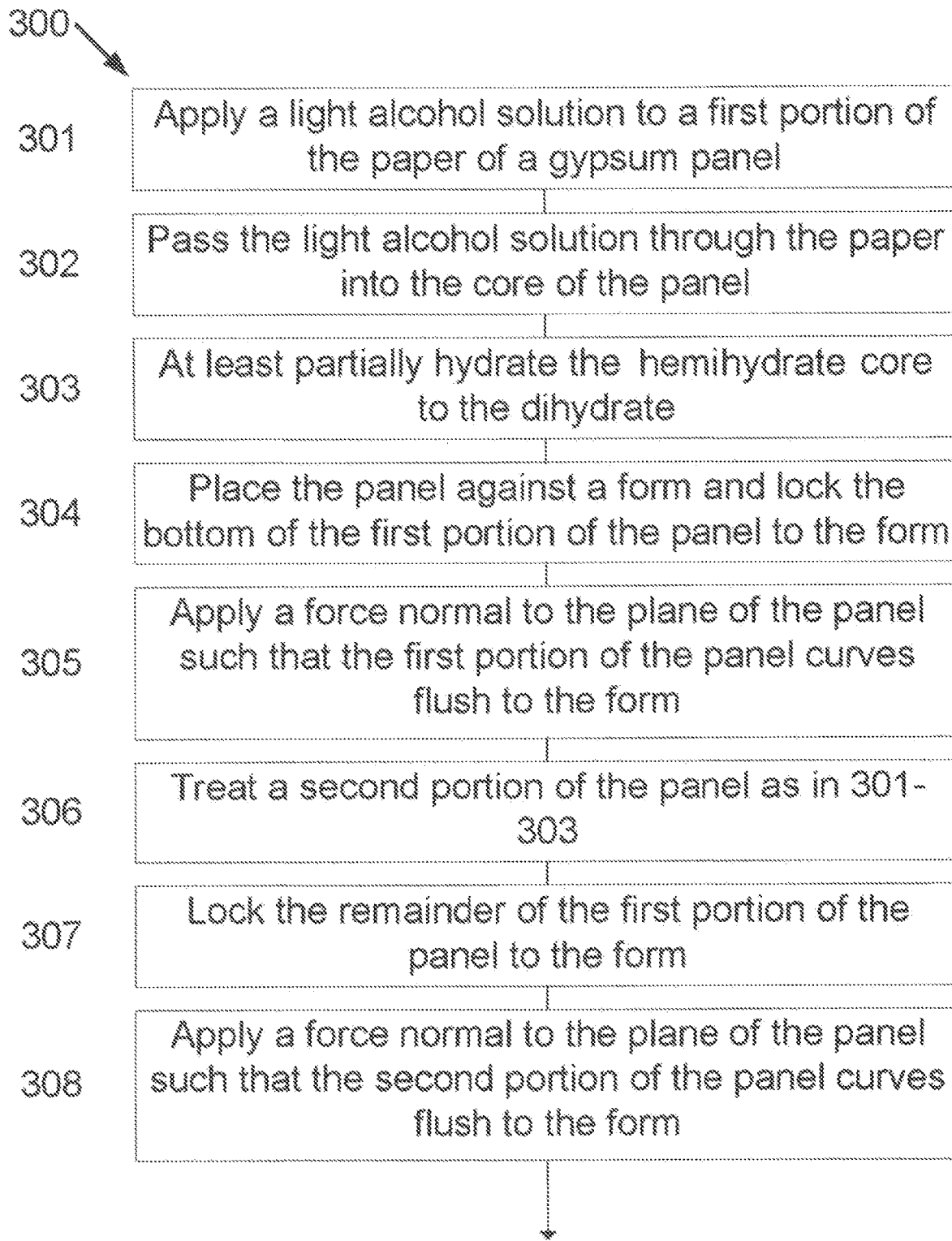
FIGS. 3A and 3B is a diagram showing a method for shaping a gypsum panel into a curve.
Figure 3B:
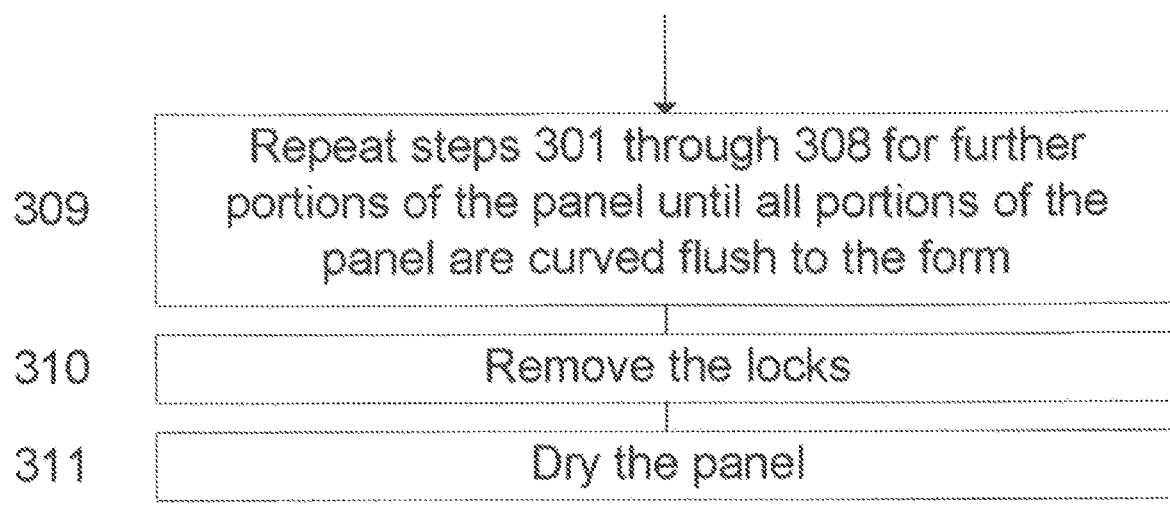

Referring now to FIGS. 3A and 3B, FIGS. 3A and 3B is a diagram showing a method 300 for shaping a gypsum panel into a curve that may be used in the described devices and methods. At 301, a light alcohol solution is applied to the facing and backing paper of a first portion of a gypsum panel. At 302, the light alcohol solution passes through the facing paper into the calcium sulfate hemihydrate core of the gypsum panel. At 303, the hemihydrate is at least partially hydrated to form the dihydrate. At 304, the gypsum panel is placed against a form and the bottom of the first portion of the gypsum panel is locked to the form. At 305, a force is applied normal to the plane of the gypsum panel such that the first portion of the gypsum panel curves flush to the form. At 306, a second portion of the gypsum panel adjacent the first portion is treated as in 301 through 303. At 307, the remainder of the first portion of the gypsum panel is locked to the form. At 308, a force is applied normal to the plane of the gypsum panel such that the second portion of the gypsum panel curves flush to the form. At 309, steps 301 through 308 are repeated for further portions of the gypsum panel until all portions of the gypsum panel are curved flush to the form. At 310, the locks are removed. At 311, the gypsum panel is dried to remove the light alcohol solution and return the calcium sulfate to the hemihydrate form.

In some embodiments, the light alcohol solution includes methanol, ethanol, propanol, isopropanol, n-butanol, sec-butanol, isobutanol, tert-butanol, or a combination thereof. In some embodiments, the water in the light alcohol solution has pH modifiers, salts, binders, or other additives to modify the light alcohol solution for increased permeability through the paper facing and backing.

In a preferred embodiment, the light alcohol solution has at least 2 wt % alcohol and at most 95 wt % alcohol. In a more preferred embodiment, the light alcohol solution has at least 5 wt % alcohol and at most 91 wt % alcohol. In a most preferred embodiment, the light alcohol solution has between 20-35 wt % alcohol.

In one example, a 5 wt % isopropanol solution is applied to the facing and/or backing paper. An application of 0.135 grams of the 30 wt % isopropanol solution per square inch of paper would be sufficient to provide formability, shape-ability, and/or pattern-ability to a typical ½" gypsum panel.

The duration that the light alcohol solution should be applied before forming, shaping, or compressing depends on the strength of the solution. The solution may be applied for as little as 1 to 2 seconds in the case of 25 wt %. The solution may need to be applied for five or more minutes in the case of 5 wt %.

The amount of force applied to the gypsum panel depends on the amount of light alcohol solution used. With a 25 wt % solution, as little as 10 psi will cause changes to the physical form of the gypsum panels. With a 5 wt % solution, greater forces may be required, depending on the desired effect. This may be as much as 20,000 psi or more, in some cases.

Figure 4A:
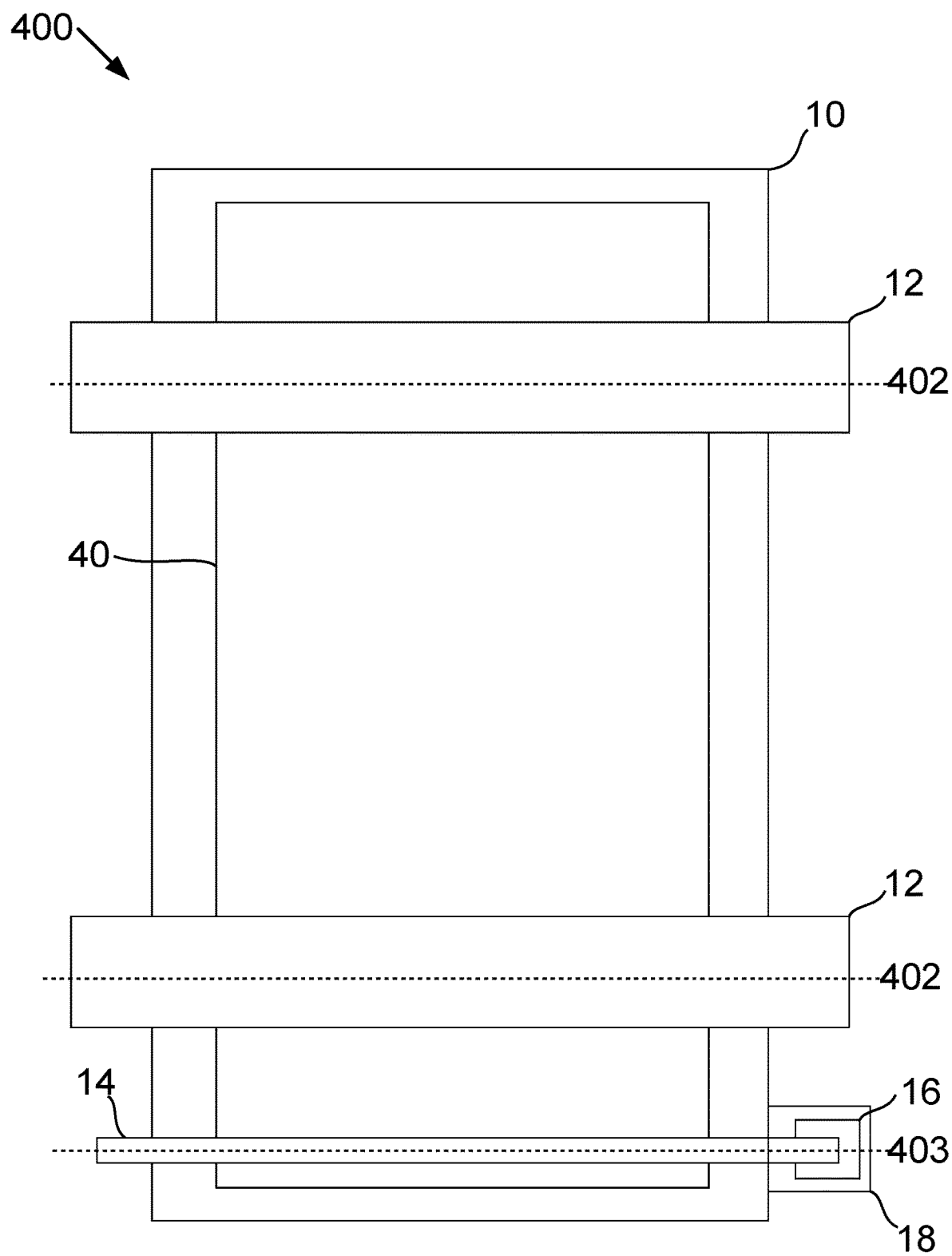
FIG. 4A shows a top view of a table for deforming a building panel.
Figure 4B:
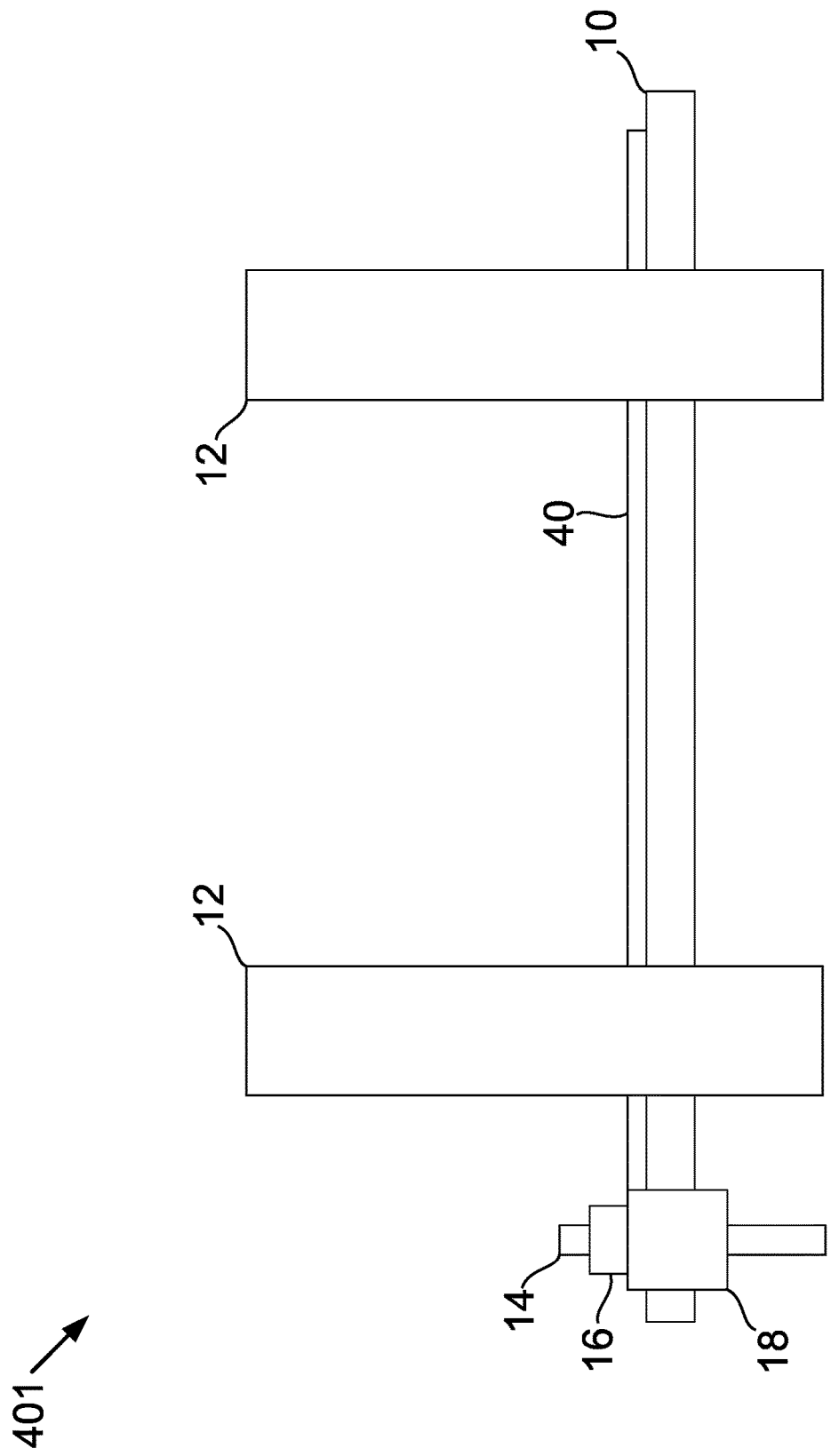
FIG. 4B shows a right-side elevation view of the table of FIG. 4A.
Figure 4C:
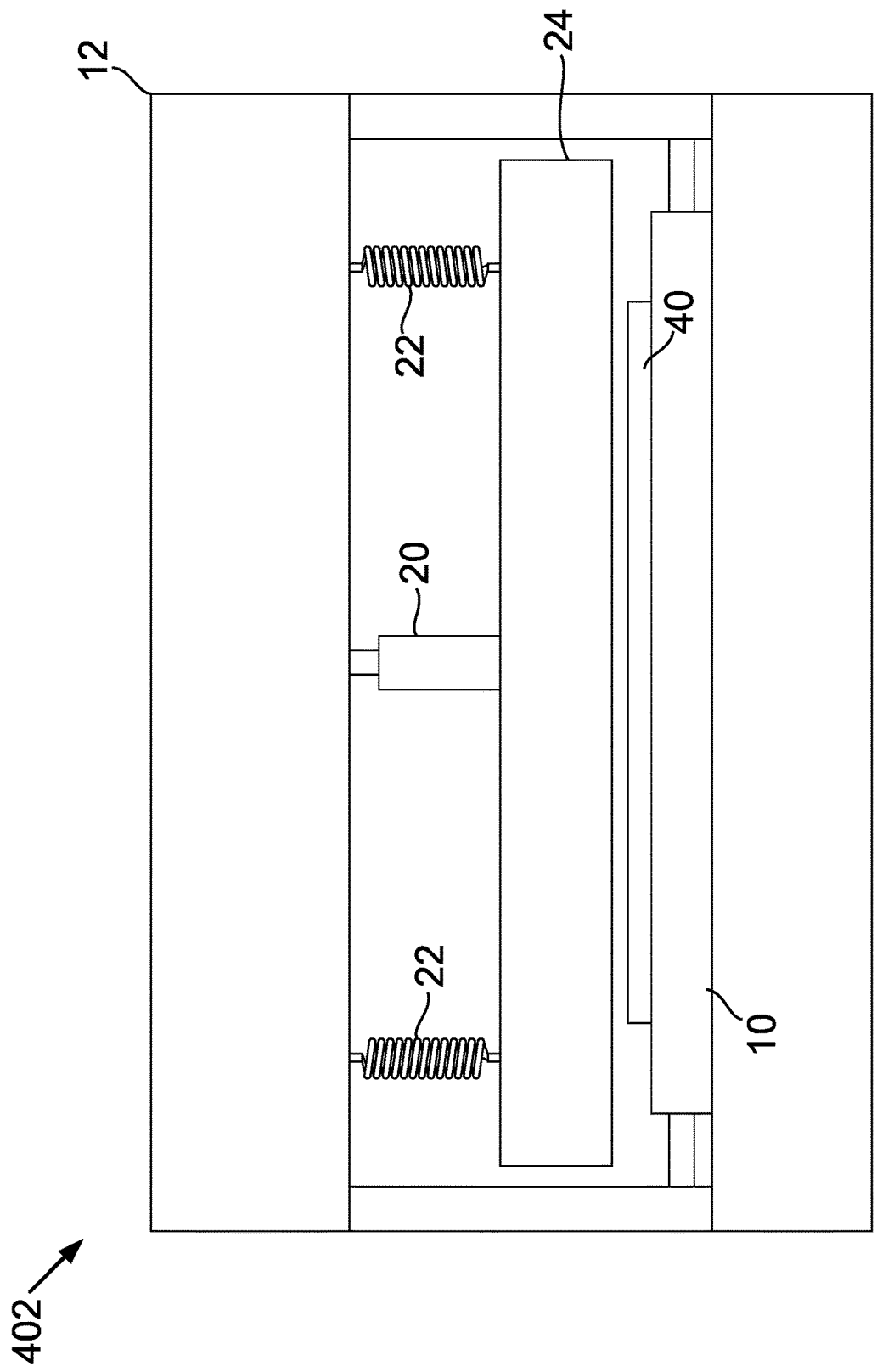
FIG. 4C shows a front-elevation cross-sectional view of either of the press assemblies of the table of FIG. 4A.
Figure 4D:
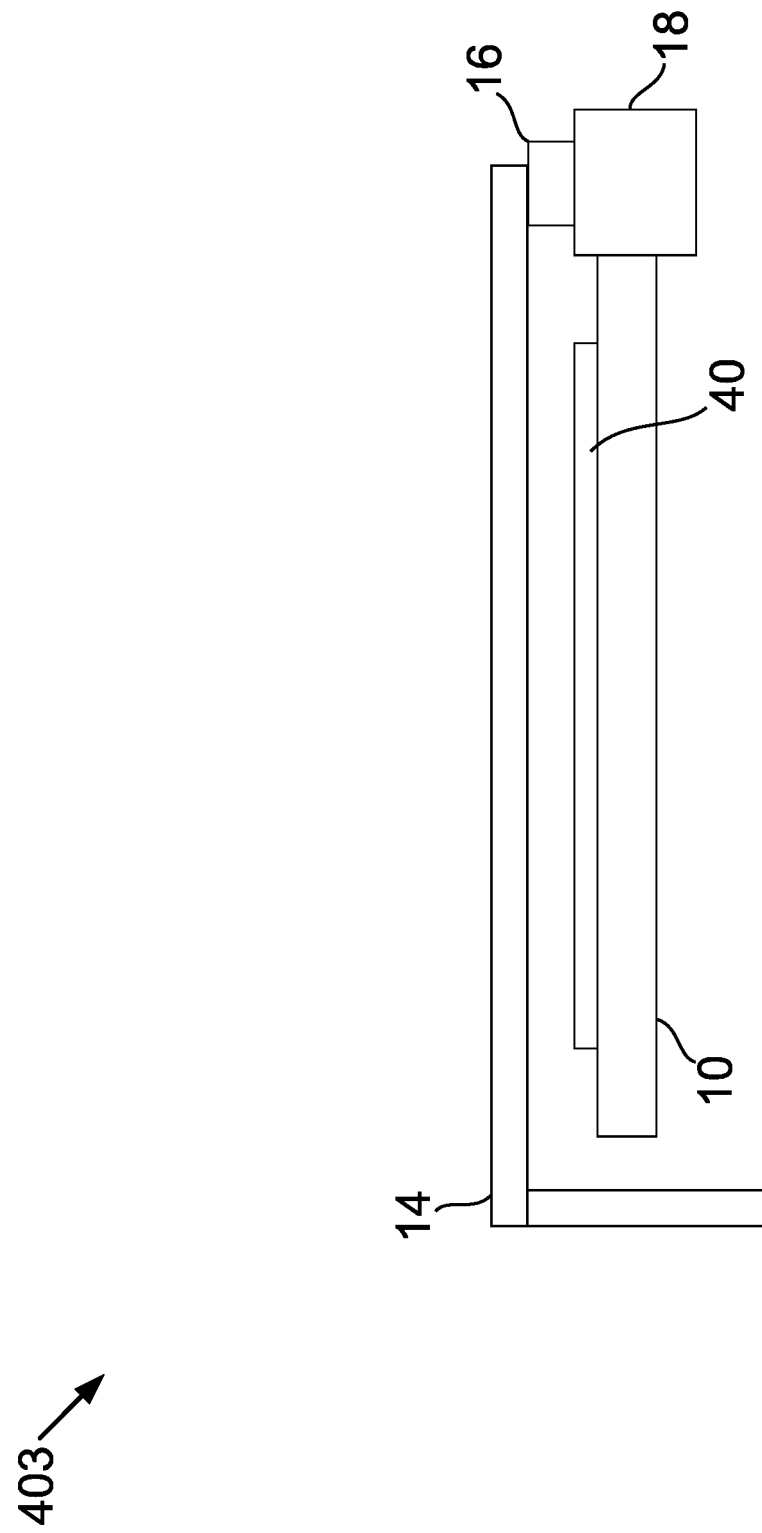
FIG. 4D shows a front-elevation cross-sectional view of the liquid applicator of the table of FIG. 4A.

Referring now to FIG. 4, FIG. 4A shows a top view 400 of a table that may be used with the disclosed devices and methods. FIG. 4B shows a right-side elevation view 401 of the table of FIG. 4A. FIG. 4C shows a front-elevation cross-sectional view 402 of either of the press assemblies of the table of FIG. 4A. FIG. 4D shows a front-elevation cross-sectional view 403 of the liquid applicator of the table of FIG. 4A. The table 10 includes two press assemblies 12, a liquid applicator arm 14, a liquid applicator 16, and a liquid trough 18. In some embodiments, the liquid applicator 16 is a sponge. In other embodiments, the liquid applicator 16 may be a spray nozzle with the liquid trough 18 replaced by a hose that attaches to the spray nozzle. The liquid applicator 16 travels back and forth across the liquid applicator arm 14 to spread a liquid solution across the surface of a building panel 40. The building panel 40 is moved (not shown) so that the surface on which liquid has been applied is moved under one of the two press assemblies 12. The press assemblies 12 have a piston 20 that pushes the platten 24 against the building panel 40, applying a force to the building panel 40 that is substantially normal to the plane of the building panel 40. Springs 22 pull the platten 24 back after pressing the building panel 40. The force applied by the platten 24 deforms the building panel as desired. In some embodiments, the platten 24 has a pattern on the bottom surface of the platten 24 which is embossed into the surface of the building panel 40. In other embodiments, the platten 24 will press evenly across the building panel 40, causing the building panel 40 to be pressed to a uniform thickness.

The table 10 of FIG. 4 is one example of a mounting structure. In other embodiments, the mounting structure could be a curved surface around which the building panel 40 could be curved.

In other embodiments, the mounting structure is portable and is mounted to a cut edge of the building panel after the liquid solution is applied to the cut edge of the building panel. The mounting structure then compresses only a portion of the building panel, in this instance, the edge of the building panel. In this manner, the edge of the building panel is compressed to the same thickness as an uncut edge of the building panel. Once the building panel is mounted on the wall or ceiling, the cut edge has the same thickness as any adjacent uncut edge, allowing for mudding and taping of the joints to be easier, faster, and therefore cheaper.

In some embodiments, the compressing, forming, and shaping methods are accomplished using automatic equipment. For example, the light alcohol solution may be sprayed by an automatic spraying system onto the gypsum panels. The treated gypsum panel may then be placed into a device that automatically applies the force to the panel needed to compress, form, or shape the gypsum panel, as needed.

In some embodiments, a dye is added to the solution to indicate where solution has been applied.

In some embodiments, an ink jet system is used for the liquid applicator.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A method for modifying a building panel, the building panel including a first surface comprising a facing paper and a second surface comprising a backing paper, the building panel including a core comprising calcium sulfate hemihydrate operatively arranged between the facing paper and the backing paper, the method comprising the following steps:

applying a solution comprising at least one alcohol and water to at least a predetermined portion of the facing paper, the backing paper, or the facing paper and the backing paper of the building panel for at least partially hydrating at least a predetermined portion of the calcium sulfate hemihydrate core for converting the predetermined hydrated portion of the calcium sulfate hemihydrate core which is brittle and nondeformable to calcium sulfate dihydrate which is deformable to form a deformable portion of the building panel;

applying a predetermined force to the deformable portion of the building panel substantially normal to a horizontal plane of the building panel for causing a desired deformation of the deformable portion of the building panel;

removing the predetermined force from the deformable portion of the building panel; and drying the building panel to convert the hydrated core of the deformable portion of the building panel back to the nondeformable calcium sulfate hemihydrate, wherein the at least one alcohol is selected from the group consisting of methanol, ethanol, propanol, isopropanol, n-butanol, sec-butanol, isobutanol, and tert-butanol.

2. The method of claim 1, wherein the desired deformation comprises compression of the deformable portion of the building panel, embossing a pattern on the deformable portion of the building panel, imprinting onto the deformable portion of the building panel, curving of the deformable portion of the building panel, reforming of the deformable portion of the building panel, deforming of the deformable portion of the building panel, or a combination thereof.

3. The method of claim 1, wherein the solution further comprises pH modifiers, salts, binders, or a combination thereof.

4. The method of claim 1, wherein the solution comprises between 20 wt % and 35 wt % of the at least one alcohol.

5. The method of claim 1, wherein the solution further comprises a dye for indicating where the solution has been applied.

6. A device for modifying a building panel, the building panel including a first surface comprising a facing paper and a second surface comprising a backing paper, the building panel including a core comprising calcium sulfate hemihydrate operatively arranged between the facing paper and the backing paper, the device comprising:

a mounting structure on which the building panel is mounted;

a liquid applicator for applying a solution comprising at least one alcohol and water onto at least a predetermined portion of the facing paper, the backing paper, or the facing paper and the backing paper of the building panel for at least partially hydrating at least a predetermined portion of the calcium sulfate hemihydrate core for converting the predetermined hydrated portion of the calcium sulfate hemihydrate core which is brittle and nondeformable to calcium sulfate dihydrate which is deformable to form a deformable portion of the building panel; and a force applicator for applying a predetermined force to the deformable portion of the building panel substantially normal to a horizontal plane of the building panel, the predetermined force causing a desired deformation of the deformable portion of the building panel, wherein the at least one alcohol is selected from the group consisting of methanol, ethanol, propanol, isopropanol, n-butanol, sec-butanol, isobutanol, and tert-butanol.

7. The device of claim 6, further comprising a dryer for drying the building panel to remove at least a portion of the solution from the building panel and restore at least a portion of the calcium sulfate dihydrate to the calcium sulfate hemihydrate.

8. The device of claim 6, wherein the desired deformation comprises compression of the deformable portion of the building panel, embossing a pattern on the deformable portion of the building panel, imprinting onto the deformable portion of the building panel, curving of the deformable portion of the building panel, reforming of the deformable portion of the building panel, deforming of the deformable portion of the building panel, or a combination thereof.

9. The device of claim 6, wherein the solution further comprises pH modifiers, salts, binders, or a combination thereof.

10. The device of claim 6, wherein the solution comprises between 20 wt % and 35 wt % of the at least one alcohol.

11. The device of claim 6, wherein the solution further comprises a dye for indicating where the solution has been applied.

* * * * *